(12) United States Patent
Lee

(10) Patent No.: US 11,435,745 B2
(45) Date of Patent: Sep. 6, 2022

(54) ROBOT AND MAP UPDATE METHOD USING THE SAME

(71) Applicant: LG ELECTRONICS INC., Seoul (KR)

(72) Inventor: Seung Won Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 457 days.

(21) Appl. No.: 16/490,024

(22) PCT Filed: Apr. 17, 2019

(86) PCT No.: PCT/KR2019/004633
§ 371 (c)(1),
(2) Date: Aug. 29, 2019

(87) PCT Pub. No.: WO2020/213755
PCT Pub. Date: Oct. 22, 2020

(65) Prior Publication Data
US 2021/0325890 A1    Oct. 21, 2021

(51) Int. Cl.
*G06V 10/40* (2022.01)
*G06V 10/75* (2022.01)
(Continued)

(52) U.S. Cl.
CPC ......... *G05D 1/0214* (2013.01); *G05D 1/0246* (2013.01); *G05D 1/0274* (2013.01);
(Continued)

(58) Field of Classification Search
CPC .............. G05D 1/0214; G05D 1/0246; G05D 1/0274; G05D 2201/0217; G05D 1/0221;
(Continued)

(56) References Cited

U.S. PATENT DOCUMENTS

2010/0152944 A1    6/2010    Kouno et al.
2013/0204481 A1    8/2013    Kouno et al.
(Continued)

FOREIGN PATENT DOCUMENTS

| JP | H07071959 | 3/1995 |
| JP | 2013139067 | 7/2013 |
| JP | 2018083270 | 5/2018 |

OTHER PUBLICATIONS

PCT International Application No. PCT/KR2019/004633, International Search Report dated Jan. 17, 2020, 3 pages.

*Primary Examiner* — Sze-Hon Kong
*Assistant Examiner* — Ana D Thomas
(74) *Attorney, Agent, or Firm* — Lee, Hong, Degerman, Kang & Waimey PC

(57) ABSTRACT

A robot and a map update method using the same are disclosed. The robot includes: an image acquisition unit configured to acquire an image; a first indication lamp disposed at a first location; a second indication lamp disposed apart from the first location; an image determination module configured to compare an image learned and stored in the robot with the image acquired through the image acquisition unit; and an indication lamp determination module configured to compare operation information of each of the first and second indication lamps with the image acquired through the image acquisition unit.

18 Claims, 12 Drawing Sheets

(51) Int. Cl.
*G05D 1/02* (2020.01)
*G06V 20/10* (2022.01)
*G06V 20/58* (2022.01)

(52) U.S. Cl.
CPC ............ *G06V 10/40* (2022.01); *G06V 10/751* (2022.01); *G06V 20/10* (2022.01); *G06V 20/58* (2022.01); *G05D 2201/0217* (2013.01)

(58) Field of Classification Search
CPC ...... G06V 10/40; G06V 10/751; G06V 20/10; G06V 20/58; G06V 20/20; G06K 9/6201; B25J 9/1666; B25J 9/1676; B25J 13/08; B25J 19/00
See application file for complete search history.

(56) References Cited

U.S. PATENT DOCUMENTS

| | | | |
|---|---|---|---|
| 2018/0088057 A1* | 3/2018 | Hashikami | H04N 5/2252 |
| 2020/0050206 A1* | 2/2020 | Deyle | G01S 13/881 |
| 2021/0349467 A1* | 11/2021 | Toyoura | G05D 1/0246 |

* cited by examiner a)

b)

Robot_A

Robot_A

Robot_B

Robot_A

Robot_A

Robot_B

Robot_A

Robot_A

Robot_B

Robot_A

Robot_A

Robot_B

ROBOT AND MAP UPDATE METHOD USING THE SAME

CROSS-REFERENCE TO RELATED APPLICATIONS

This application is the National Stage filing under 35 U.S.C. 371 of International Application No. PCT/KR2019/004633, filed on Apr. 17, 2019, the contents of which are hereby incorporated by reference herein in its entirety.

TECHNICAL FIELD

The present invention relates to a robot and, more particularly, to a robot capable of discriminating a mirror and a map update method using the same.

BACKGROUND ART

In general, robots have been developed for industrial purposes and have taken charge of factory automation. In recent years, medical robots, aerospace robots, and home robots for general domestic use have been produced through expansion of application of robots. Among such robots, robots capable of automatically traveling are referred to as movable robots.

Among movable robots, the development of autonomous movable robots capable of moving and avoiding an obstacle through autonomous determination is being accelerated.

DISCLOSURE

Technical Problem

It is an aspect of the present invention to provide a robot that can determine whether an obstacle is a mirror upon detection of the obstacle during movement and can update a location of the mirror on a map with coordinates of the obstacle, and a map update method using the same.

The above and other aspects and advantages of the present invention will become apparent from the detailed description of the following embodiments in conjunction with the accompanying drawings. In addition, it will be readily understood that the aspects and advantages of the present invention can be realized by features set forth in the appended claims and combinations thereof.

Technical Solution

In accordance with one aspect of the present invention, a robot includes: an image acquisition unit acquiring an image; a first indication lamp disposed at a first location; a second indication lamp disposed apart from the first location; an image determination module comparing an image learned and stored in the robot with the image acquired through the image acquisition unit; and an indication lamp determination module comparing operation information of each of the first and second indication lamps with the image acquired through the image acquisition unit.

In accordance with another aspect of the present invention, a map update method using a robot includes: an object finding step in which the robot finds an object during movement; a mirror determination step in which the robot determines whether the found object is a mirror; a mirror approach step in which the robot approaches a location disposed apart from the mirror by a preset distance, upon determining in the mirror determination step that the found object is the mirror; a parallel movement step in which the robot acquires movement location information while moving parallel to the mirror; and updating location information of the mirror with the acquired movement location information.

Advantageous Effects

According to embodiments of the invention, the robot and the map update method using the same can address a problem of damage to the robot or a mirror during movement of the robot by updating the location of the mirror on a map based on determination as to whether an obstacle is a mirror.

The above and other advantageous effects of the present invention will be described in the following description.

BEST MODE

Figure 1:
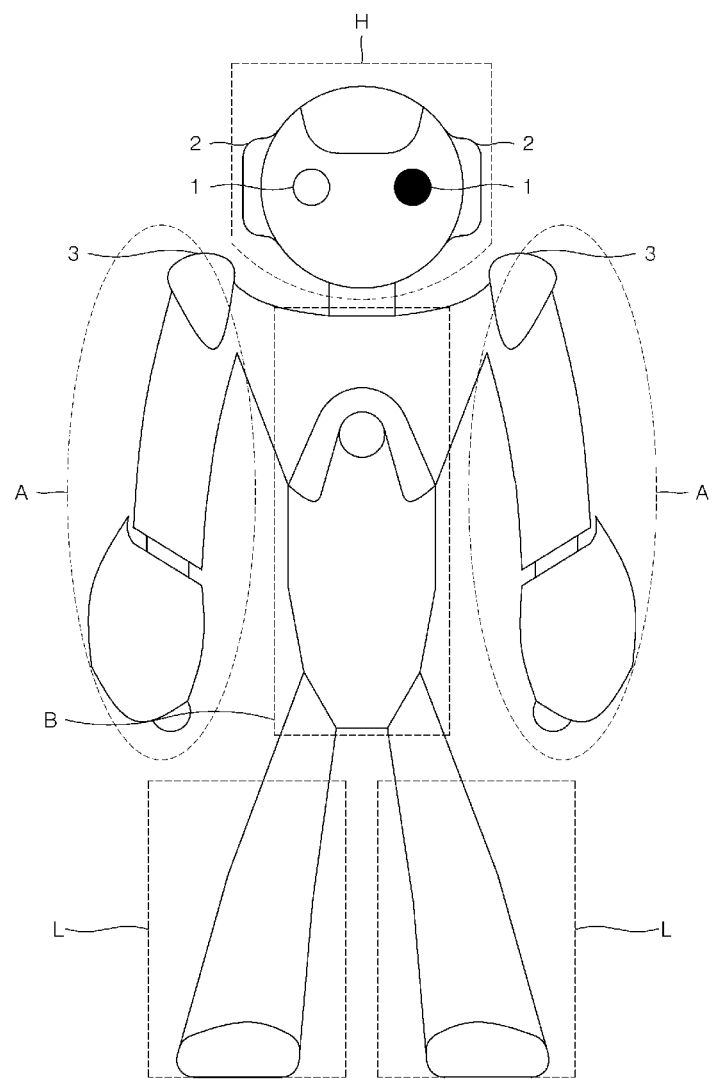
FIG. 1 is a front view of a robot according to an embodiment of the present invention.

The above and other aspects, features, and advantages of the present invention will be described in more detail in conjunction with the accompanying drawings so as to fully convey the spirit of the present invention to those skilled in the art. Descriptions of known functions and constructions which can unnecessarily obscure the subject matter of the present invention will be omitted. Hereinafter, embodiments of the present invention will be described in detail with reference to the accompanying drawings. Like components will be denoted by like reference numerals throughout the accompanying drawings.

Herein, when a certain element or component is referred to as being "disposed at an upper portion (lower portion)" or "disposed on (under)" another element or layer, this means that the certain element or component can adjoin an upper (lower) surface of the other element or component or intervening elements or components can be present therebetween.

In addition, when a certain element or component is referred to as being "connected to", "coupled to" or "joined to" another element or component, it means that these elements or components may be directly connected to, coupled to or joined to each other or through another element or component, or another element or component may be "interposed" therebetween.

Hereinafter, a robot and a map update method using the same according to some embodiments of the present invention will be described.

FIG. 1 is a front view of a robot according to an embodiment of the present invention.

Referring to FIG. 1, the robot according to the embodiment may have a similar shape to the human body, that is, a humanoid shape composed of a head H, a main body B, a pair of arms A and a pair of legs L. Here, it should be understood that the robot shown in FIG. 1 is provided by way of one embodiment and the present invention is applicable to any autonomous mobile robot.

The present invention provides a robot capable of discriminating a mirror using indication lamps thereof during movement. For example, LED lamps provided to the robot according to the embodiment may be disposed at locations of the robot such that the right and the left of the robot can be discriminated. More specifically, for example, an indication lamp (for example, LED lamp) may be provided to at least one of Location 1 of the head H, Location 2 of the head H, and Location 3 of the arm A of the robot.

The head H, the body B, the arms A and the legs L of the robot shown in FIG. 1 may be provided with sensors related to operation of the robot. In addition, the legs L of the robot shown in FIG. 1 are configured to allow movement of the robot. Although the legs of the robot have a human leg shape, it should be understood that the legs of the robot according to the present invention may be realized by any movable means, such as wheels.

As described above, since the present invention relates to a robot that is provided with a plurality of indication lamps to discriminate a mirror and can update a location of the mirror on a map, detailed descriptions of the arm and main body of the robot will be omitted herein.

Figure 2:
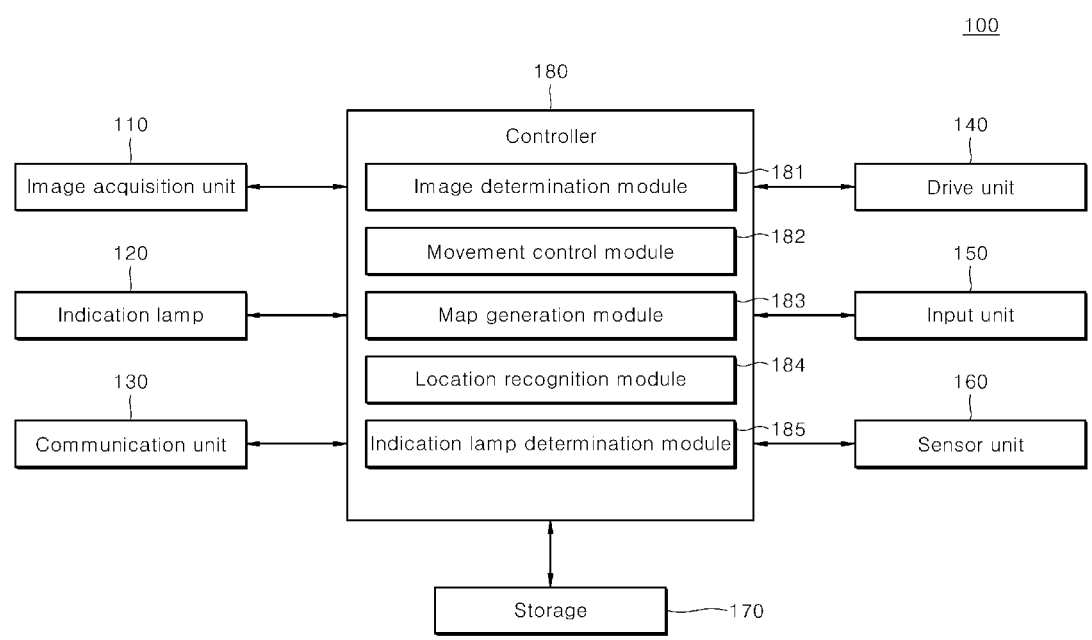
FIG. 2 is a block diagram of the robot according to the embodiment of the present invention.

FIG. 2 is a block diagram of the robot according to the embodiment of the present invention.

Referring to FIG. 2, a robot 100 according to one embodiment of the invention includes an image acquisition unit 110, an indication lamp 120, a communication unit 130, a drive unit 140, an input unit 150, a sensor unit 160, a storage 170, and a controller 180.

The image acquisition unit 110 may include a camera module as a component for photographing surroundings of the robot, a moving area of the robot, and an external environment. The camera module may include at least one optical lens, an image sensor (for example, CMOS image sensor) provided with a plurality of photodiodes (for example, pixels) to form an image by light having passed through the optical lens, and a digital signal processor (DSP) to compose an image based on a signal output from the photodiodes. The digital signal processor may generate a moving image composed of still images (for example, pictures) and frames consisting of still images. The image acquisition unit 110 may acquire an image by photographing the surroundings of the robot 100 and the obtained image may be stored in the storage 170.

The image acquisition unit 110 may be provided in plural to each part (for example, the head, the body, the arms, and the legs) of the robot 100 in order to increase photographing efficiency.

In the robot according to the embodiment, the indication lamp 120 (for example, LED lamp) may be singularly provided to each of the right and the left at Location 1 of the robot head H. The indication lamps 120 may include a first indication lamp provided to left location 1 of the robot head H and a second indication lamp provided to right location 1 of the robot head H. Here, the image acquisition unit 110 may be provided together with the indication lamp 120 to the robot head H. Although the indication lamps 120 are described as being provide to Location 1 of the robot head H, the plural indication lamps may be disposed at different locations on the robot to be disposed apart from each other. In this case, the first indication lamp is disposed at one location on the left of the robot and the second indication lamp is disposed at one location on the right of the robot.

The communication unit 130 may transmit/receive data with other external devices, such as a mobile terminal, a server, and another robot. For example, the communication unit 130 may share or transmit data of current location information and current status information of the robot 100 with a server or other devices.

The drive unit 140 may include any device capable of moving the robot 100. For example, the drive unit 140 may include the legs L of the robot 100 shown in FIG. 1.

The input unit 150 may include an input module capable of receiving data from external devices.

The sensor unit 160 may include a plurality of sensors capable of detecting all data related to driving, operation, and status of the robot 100. For example, the sensor unit 160 may include an infrared sensor, an ultrasonic sensor, an RF sensor, a geomagnetic sensor, an infrared distance sensor, and the like to detect an obstacle. In addition, the sensor unit 160 may include a light detection and ranging (LiDAR) device. The LiDAR device can monitor an object, such as an obstacle, using a phase difference of a transmitted/received signal through laser light, and can detect a distance, a relative speed, and a position of the object.

The storage 170 may store data related to the robot 100. For example, the storage 170 records various types of information for controlling the robot 100 and may include volatile or nonvolatile recording media. The recording media store data that can be read by a microprocessor, and may include a hard disk drive (HDD), a solid state drive (SSD), a silicon disk drive (SDD), a read-only memory (ROM), a random access memory (RAM), CD-ROM, a magnetic tape, a floppy disk, an optical data storage device, and the like.

The controller 180 may control overall operation of the robot 100 by controlling the image acquisition unit 110, the indication lamp 120, the communication unit 130, the drive unit 140, the input unit 150, the sensor unit 160, and the storage 170, which constitute the robot. For example, the controller 180 may identify a robot having the same shape as the robot under operation through an image determination module 181. The controller 180 may allow movement of the robot 100 through a movement control module 182. The controller 180 may generate a map along a movement path of the robot 100 through a map generation module 183. The controller 180 may estimate and recognize a current location of the robot 100 through a location recognition module 184. The controller 180 may determine whether an obstacle is a mirror through an indication lamp determination module 185.

The controller 180 may include the image determination module 181, the movement control module 182, the map generation module 183, the location recognition module 184, and the indication lamp determination module 185.

The image determination module 181 may determine whether an obstacle is a robot having the same shape as the robot under operation based on an image (an image of the robot) learned and stored therein and an image acquired through the image acquisition unit 110. For example, the image determination module 181 recognizes an image of the robot based on machine learning and compares the image acquired through the image acquisition unit 110 with the recognized image to determine whether the obstacle is a robot having the same shape as the robot under operation.

The movement control module 182 controls movement (driving) of the robot 100 and may control the drive unit 140. For example, the movement control module 182 may control the moving speed and the moving direction of the robot 100 and may calculate a driving distance based on the moving speed and the moving direction.

The map generation module 18 may generate a map along the movement path of the robot 100 through the image acquisition unit 110 and the location recognition module 184. For example, the map generation module 18 may generate a map based on a surrounding image acquired through the image acquisition unit 110 and the coordinates of the robot acquired through the location recognition module 184. In this case, the generated map may be transmitted to a server through the communication unit 130 or stored in the storage 170.

The location recognition module 184 may estimate and recognize a current location of the robot based on the map stored in the storage 170 and data input through the image acquisition unit 110 and the sensor unit 160. For example, the location recognition module 184 may estimate coordinates corresponding to the current location of the robot on the map based on a stored map (in the storage), an acquired surrounding image (from the image acquisition unit), and a GPS detection result (from the sensor unit).

The indication lamp determination module 185 may control the indication lamps 120 and may determine whether an obstacle is a mirror based on the indication lamps controlled by the robot and the image acquired by the image acquisition unit 110. For example, if the image determination module 181 determines that the obstacle is a robot having the same shape as the robot under operation, the indication lamp determination module 185 may allow the indication lamps 120 on the right and the left of the robot to operate differently. In this case, the indication lamp determination module 185 may determine whether the obstacle is a mirror by comparing the information of the indication lamps 120 operating differently with the image acquired through the image acquisition unit 110.

Figure 3:
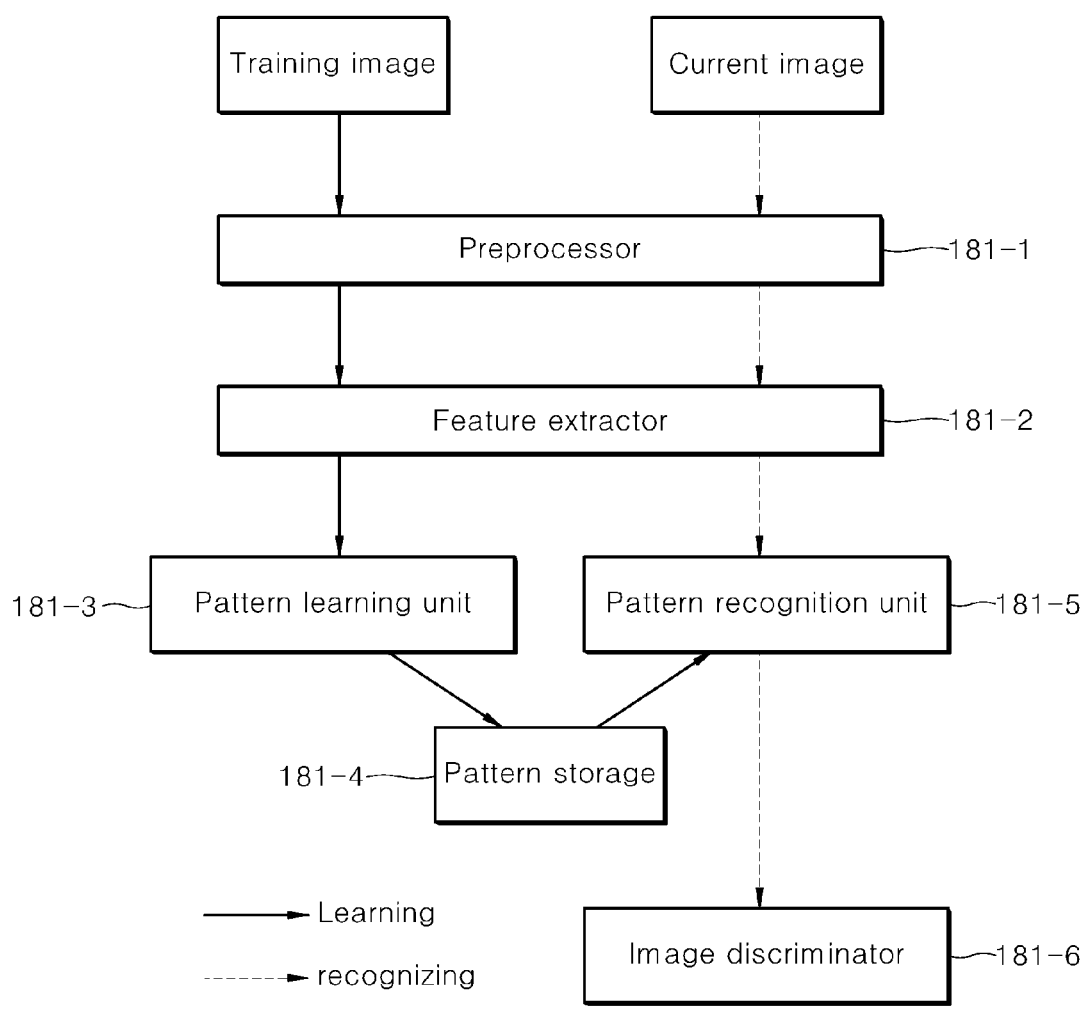
FIG. 3 is a block diagram of an image determination module in FIG. 2.

FIG. 3 is a block diagram of the image determination module in FIG. 2.

Referring to FIG. 3, the image determination module 181 may include a preprocessor 181-1, a feature extractor 181-2, a pattern learning unit 181-3, a pattern storage 181-4, pattern recognition unit 181-5 and an image discriminator 181-6. A training image is an image input through the communication unit 130 or the input unit 150 of FIG. 2 and may be a robot image. An current image may include an image acquired through the image acquisition unit 110 of FIG. 2.

The preprocessor 181-1 generates data by processing the training image input through the communication unit 130 or the input unit 150 and the current image acquired through the image acquisition unit 110, and may perform one or more preprocessing operations of binarization, sessionization, and noise cancellation on the training and current images.

The feature extractor 181-2 may extract features, that is, data patterns, required for robot recognition with respect to the image data generated by the preprocessor 181-1.

The pattern learning unit 181-3 may learn a feature, that is, a data pattern, extracted from the feature extractor 181-2. For example, the pattern learning unit 181-3 may perform pattern learning using at least one of an artificial neural network, back propagation (BP), instance based learning (IBL), and C4.5. An artificial neural network is an information processing system or statistical learning algorithm based on the structure of the biological nervous system, and may refer to overall models in which artificial neurons forming a network through synaptic coupling have a problem solving ability by changing coupling strength of synapses through learning. Neurons of the artificial neural network are activated by pixels of an input image and activation of the neurons can be transferred to other neurons after application of transformation of functions and weighting. This process is repeated until the last neuron is activated and depends on the content of an input image. Back propagation (BP), IBL, and C4.5 are related to learning algorithms similar to artificial neural networks.

According to the embodiment of the invention, the pattern learning unit 181-3 learns the data pattern with respect to the image of the robot by generating data from the training image, that is, the image of the robot, and repeatedly learning the image data of the robot.

The pattern storage 181-4 may store the data pattern learned by the pattern learning unit 181-3. Here, the pattern storage 181-4 may be a recording medium disposed in the image determination module 181 or the storage 170 disposed in the controller 180.

The image discriminator 181-6 may compare data patterns with respect to the feature of the current image extracted from the feature extractor 181-2 based on the data pattern stored in the pattern storage 181-4.

As such, the image determination module 181 according to the embodiment of the invention may store the data pattern learned based on the training image, which is the same as the image of the robot, in the pattern storage 181-4 and may determine whether the substance of the image acquired through the image acquisition unit 110, that is, an obstacle or an object, is a robot having the same shape as the robot under operation, by comparing the stored data pattern with the data pattern input through the image acquisition unit 110.

Figure 4:
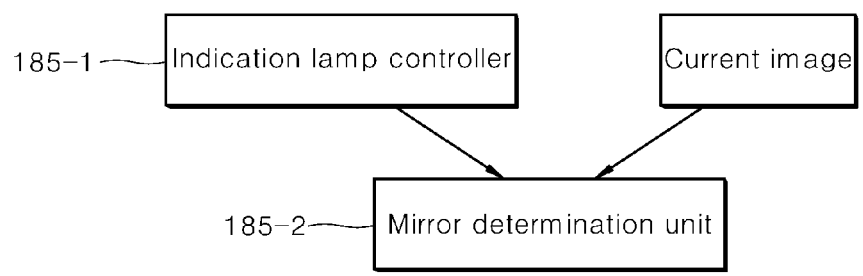
FIG. 4 shows an indication lamp determination module in FIG. 2.
Figure 4:
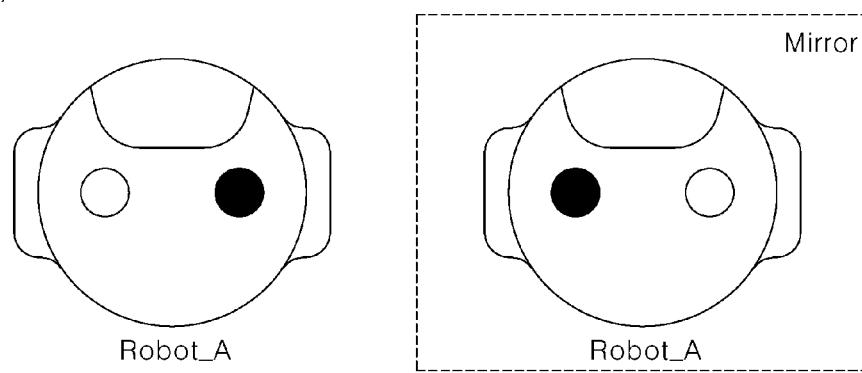
Figure 4:
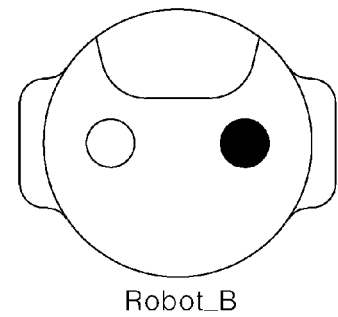

FIG. 4 shows the indication lamp determination module shown in FIG. 2.

If it is determined by the image determination module 181 that the image acquired by the image acquisition unit 110 is the same as the image of the robot, the indication lamp determination module 185 may operate.

Referring to FIG. 4, the indication lamp determination module 185 may include an indication lamp controller 185-1 and a mirror determination unit 185-2.

The indication lamp controller 185-1 may control the indication lamps disposed on the right and left sides of the robot to operate differently upon determining that the image acquired through the image determination module 181 is the same as the image of the robot. For example, the indication lamp controller 185-1 may control the indication lamp at the right and the indication lamp at the left to emit light having different colors. The indication lamp controller 185-1 may control the indication lamp at the right to be turned on and the indication lamp at the left to be turned off. The indication lamp controller 185-1 may control the indication lamp at the left to flicker while allowing the indication lamp at the right side to be turned on.

The mirror determination unit 185-2 may determine whether the current image acquired through the image acquisition unit 110 is a mirror or the same as the image of the robot by comparing with the current image acquired through the image acquisition unit 110 based on indication lamp operation information with respect to how the indication lamp controller 185-1 controls the indication lamps at the right and the left.

Referring to b) of FIG. 4, operation of the mirror determination unit 185-2 will be described. Here, it is assumed that the indication lamps 120 are provide to Location 1 of the robot head H of FIG. 1 and the indication lamp controller 185-1 controls the indication lamp at the left to be turned on and the indication lamp at the right to be turned off.

If the image of the robot head H acquired through the image acquisition unit 110 shows that the indication lamp at the left is turned on and the indication lamp at the right is turned off, the mirror determination unit 185-2 may determine that a mirror is present on a movement path of the robot 100, since the image acquired through image acquisition unit 110 is the same as the image of the robot.

On the other hand, if the image of the robot head H acquired through the image acquisition unit 110 shows that the indication lamp at the left is turned off and the indication lamp at the right is turned on, the mirror determination unit 185-2 may determine that the image acquired through image acquisition unit 110 is an image of another robot having the same shape as the robot.

This operation can be realized since the mirror determination unit 185-2 can receive, from the indication lamp controller 185-1, the indication lamp operation information on how the indication lamp controller 185-1 controls the indication lamps at the right and the left of the robot, and the current image sent from the image acquisition unit 110.

Figure 5:
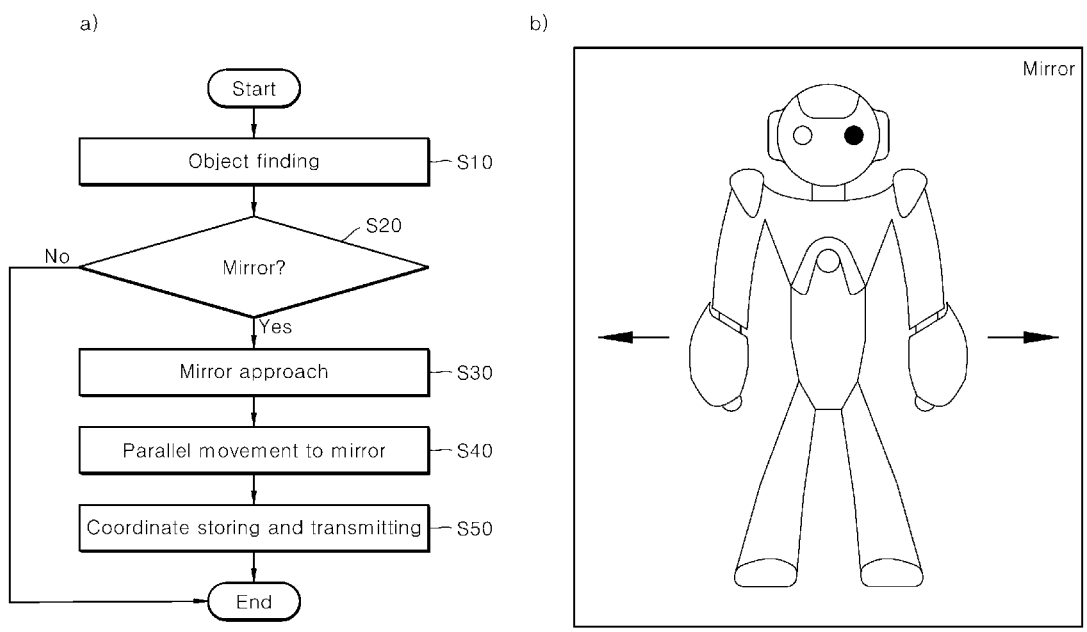
FIG. 5 is a view of a map generation module in FIG. 2.

FIG. 5 is a view of the map generation module shown in FIG. 2.

The robot capable of discriminating a mirror according to the embodiment of the invention may be used to update an installation location of the mirror on a map.

The robot 100 may find an obstacle or an object through the image acquisition unit 110 and the sensor unit 160 during movement (object finding, S10).

The robot 100 may determine whether the obstacle or the object is a mirror through the image determination module 181 (mirror determination, S20).

If it is determined that the obstacle on a movement path of the robot 100 is a mirror, the robot 100 may move to a location separated therefrom by a distance preset by the sensor unit 160 to approach the mirror (mirror approach, S30).

After approaching the mirror, the robot 100 may move parallel to the mirror (parallel movement to mirror, S40). Here, the robot 100 may move in at least one direction of a rightward direction and a leftward direction to be parallel to the mirror. The robot 100 may acquire a mirror image of the robot reflected by the mirror through the image acquisition unit 110 and may move until it is not determined that the image acquired through the image acquisition unit 110 is the image of the robot (to one end of the mirror). In addition, the robot 100 having moved to the one end of the mirror may move in an opposite direction until it is not determined that the image acquired through the image acquisition unit 110 is the image of the robot (to the other end of the mirror).

The robot 100 may store coordinates of the movement path of the robot moved parallel to the mirror through the location recognition module 184 and transmit the stored coordinates to a server, another robot or another device through the communication unit 130 (coordinate storing and transmitting, S50). In addition, the robot 100 may update the coordinates of an obstacle, which is determined to be a mirror, on the map through the map generation module 183. In addition, the server, the other robot or the other device receiving the coordinates corresponding to the location of the mirror transmitted by the robot 100 may update the location of the mirror on the map.

Figure 6:
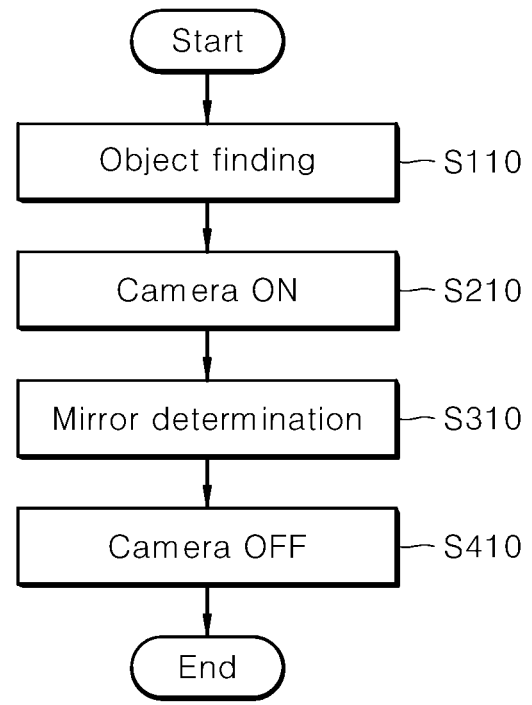
FIG. 6 is a flowchart illustrating an operation method of the robot according to the embodiment of the present invention.

FIG. 6 is a flowchart illustrating an operation method of the robot according to the embodiment of the present invention.

The robot 100 according to the embodiment of the invention may be required to control the image acquisition unit 110 and the sensor unit 160 to be maintained in an operating (ON) state in order to determine whether an obstacle is a mirror. In order to reduce power consumption of the robot 100, among the image acquisition unit 110 and the sensor unit 160, only the sensor unit 160 may be maintained in an operating state and the image acquisition unit 110 may be operated as needed, that is, upon determining whether the obstacle is the mirror.

FIG. 6 shows an operation method of the robot 100 for reducing power consumption of the robot 100.

The robot 100 finds an obstacle or an object on a movement path of the robot 100 through the sensor unit 160 (finding object, S110).

The robot 100 turns on the image acquisition unit (camera) 110 to determine whether an object is a mirror (camera ON, S210).

The robot 100 determines whether the object found through the image determination module 181 is a mirror (mirror determination, S310). In addition, the mirror determining step (S310) may include the step of acquiring a mirror image of the robot 100 reflected by the mirror in order for the robot 100 to update the location of the mirror on a map.

After the robot 100 completes the mirror determination step, the robot 100 turns off the image acquisition unit (camera, 110) (camera OFF).

The robot 100 according to the embodiment of the invention learns an image thereof using a learning algorithm and compares the learned image with an image input through the image acquisition unit to determine whether an obstacle on the movement path of the robot is a robot having the same shape as the robot under operation. The robot according to this embodiment may determine whether the obstacle is a mirror or a robot having the same shape as the robot under operation by controlling the indication lamps at the right and the left of the robot to operate differently and determining whether the indication lamps operate in the same way as those of the robot under operation or differently therefrom on the image acquired through the image acquisition unit. If it is determined that the obstacle on the movement path of the robot is a mirror, the robot according to the embodiment of the invention moves parallel to the mirror and may estimate the location (coordinates) of the mirror to transmit information on the location of the mirror to a server, another robot or another device such that the location of the mirror can be updated on the map. In addition, the robot according to the embodiment of the invention is configured to allow a portion thereof, on which the image acquisition unit and the indication lamps are disposed, for example, the head of the robot, to be rotated in the rightward and leftward directions, whereby the image acquisition unit and the indication lamps can be reflected by the mirror even if the mirror is not located in front of the robot, thereby providing more advantages in mirror discrimination.

Figure 7:
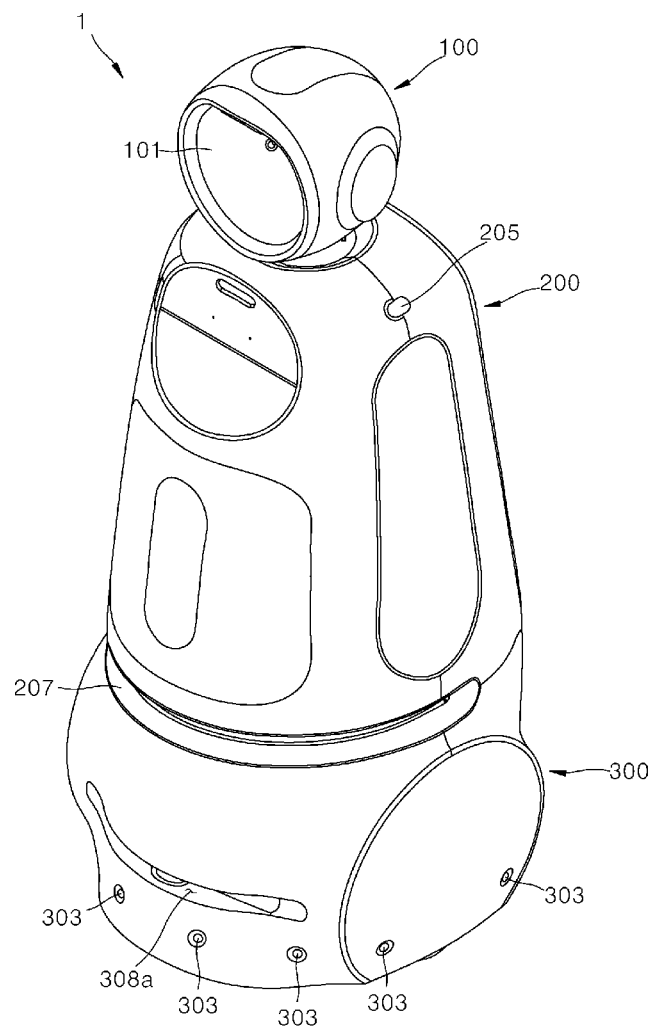
FIG. 7 is a front view of a robot according to another embodiment of the present invention.

FIG. 7 is a front view of a robot according to another embodiment of the present invention.

FIG. 7 is a front view showing an external appearance of a robot having a different shape from the robot shown in FIG. 1.

Referring to FIG. 7, a robot 1 includes a head 100, a main body 200, and a drive unit 300.

The head 100 may include a head display 101. The head 100 may be rotatable in the rightward and leftward directions.

The main body 200 may include a shoulder camera 105, which is provided to the image acquisition unit 110 of FIG. 2.

The drive unit 300 may include sensors 303, a front LiDAR 307a, and a front LiDAR groove 207, which are included in the sensor unit 160 of FIG. 2, to detect the front side of the robot. The drive unit 300 serves to move the robot 1 and corresponds to the drive unit 140.

Figure 8:
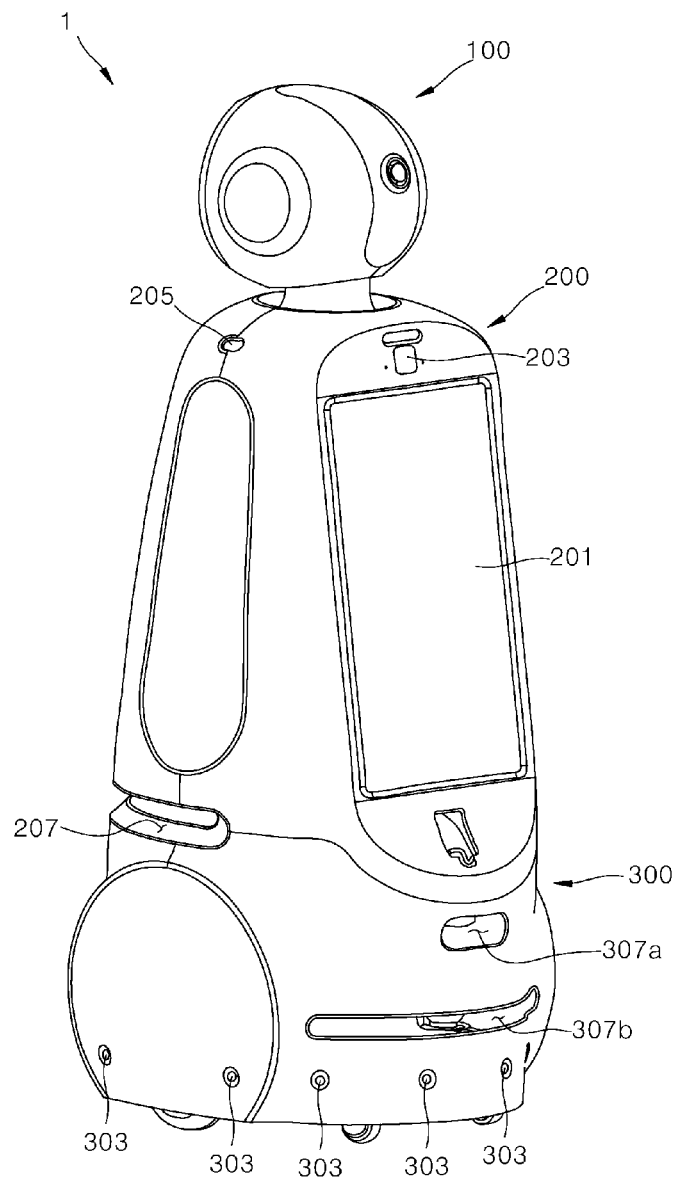
FIG. 8 is a rear view of the robot according to another embodiment of the present invention.

FIG. 8 is a rear view of the robot according to another embodiment of the present invention.

FIG. 8 shows the rear side of the robot shown in FIG. 7. Thus, the robot 1 shown in FIG. 8 may also include the head 100, the main body 200 and the drive unit 300.

Unlike the front side of the robot 1 shown in FIG. 7, the rear side of the main body 200 of the robot 1 may include a body display 201.

The drive unit 300 of the robot 1 may be provided at the rear side thereof with sensors 303 and rear LiDAR grooves 307a, 307b to detect the rear side thereof.

Although the robot 1 shown in FIG. 7 and FIG. 8 is illustrated as including the head display 101 disposed on the head 101 and the body display 201 disposed on the rear side of the main body 200, a robot including one of the head display 101 and the body display 201 may also discriminate a mirror. In addition, although FIG. 8 shows that the body display 201 is disposed on the rear side of the main body of the robot 1, the body display may be disposed on the front side of the main body of the robot.

FIG. 9 to FIG. 12 are views illustrating a mirror determination operation using a display shown in FIG. 7 and FIG. 8.

The robot shown in FIG. 1 discriminate a mirror using the indication lamps (for example, LED lamps) disposed at locations to discriminate the right and left sides, whereas the robot 1 shown in FIG. 7 and FIG. 8 may discriminate a mirror using the head display 101 and the body display 201 or one of the head display 101 and the body display 201.

Figure 9:
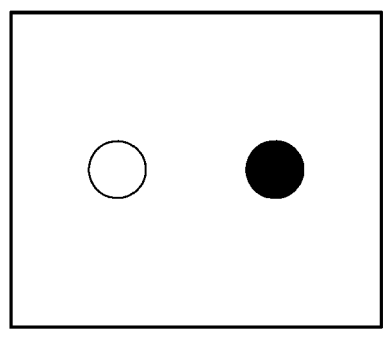
FIG. 9 to FIG. 12 are views illustrating a mirror determination operation using a display shown in FIG. 7 and FIG. 8.
Figure 9:
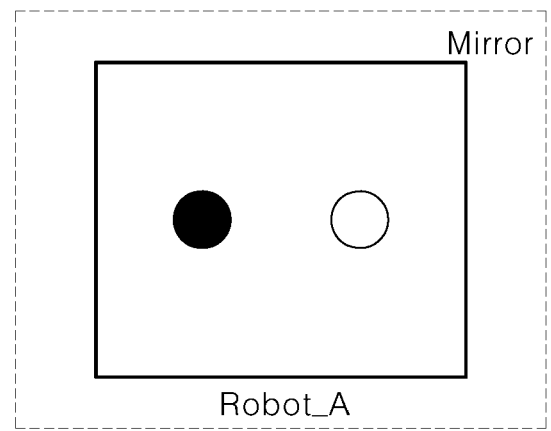
Figure 9:
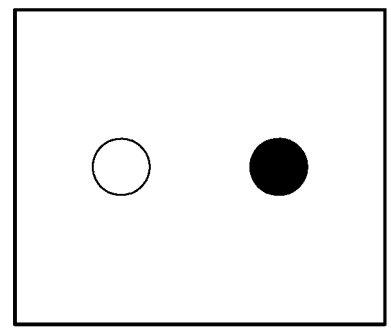

The head display 101 or the body display 201 used to discriminate a mirror may determine whether an obstacle is a mirror by displaying the same images as the indication lamps of FIG. 4 (see FIG. 9).

Figure 10:
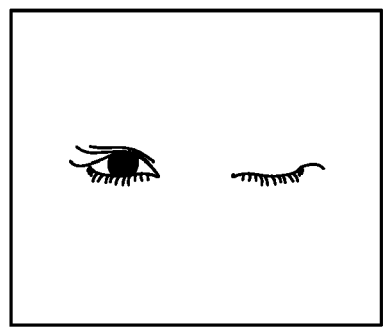
Figure 10:
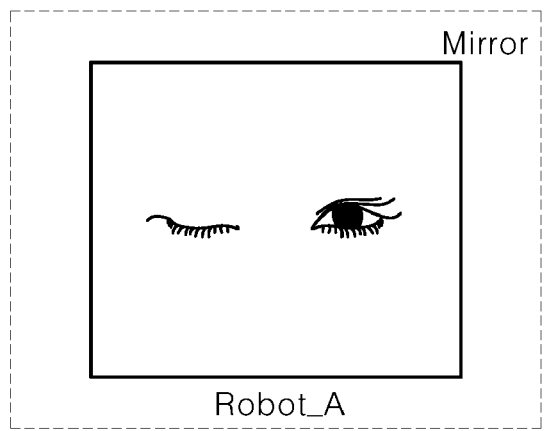
Figure 10:
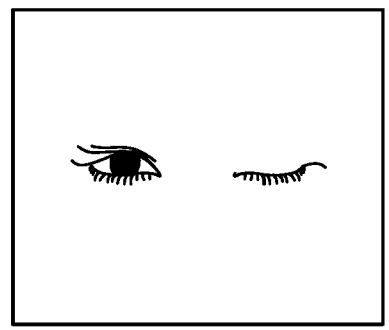

Alternatively, the head display 101 or the body display 201 used to discriminate a mirror may determine whether an obstacle is a mirror by displaying different images at the right and left sides, as shown in FIG. 10.

Figure 11:
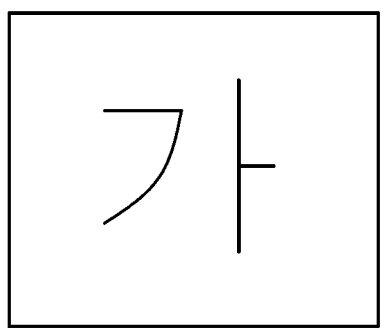
Figure 11:
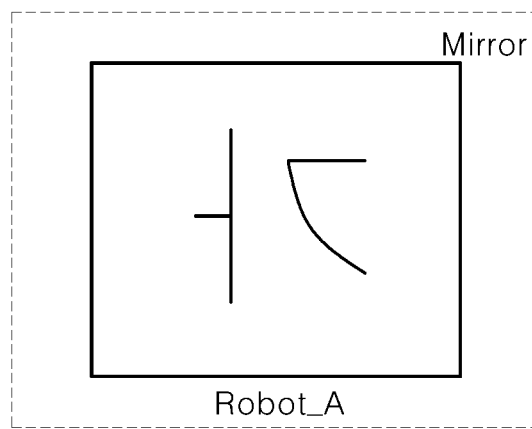
Figure 11:
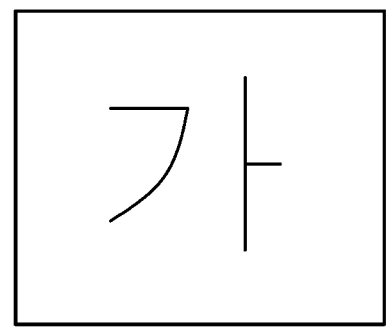

Alternatively, the head display 101 or the body display 201 used to discriminate a mirror may determine whether an obstacle is a mirror by displaying different characters at the right and left sides, as shown in FIG. 11.

Figure 12:
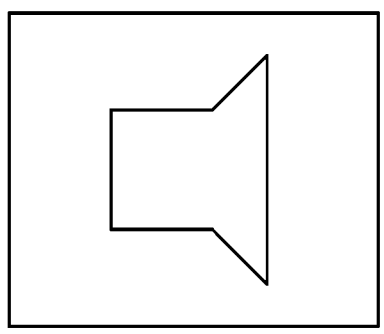
Figure 12:
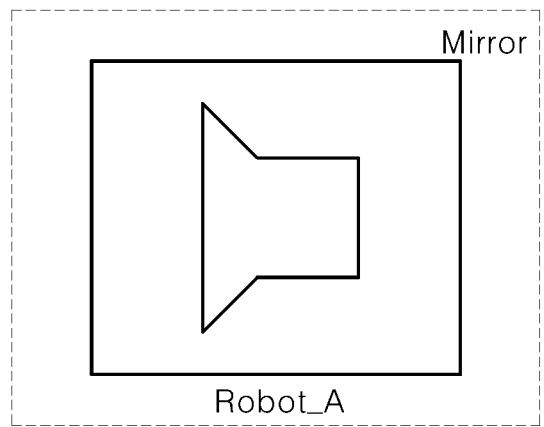
Figure 12:
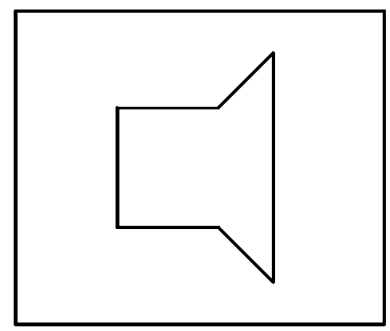

Alternatively, the head display 101 or the body display 201 used to discriminate a mirror may determine whether an obstacle is a mirror by displaying different patterns at the right and left sides, as shown in FIG. 12.

As such, the robot according to the present invention may discriminate a mirror by displaying different operation statuses of the indication lamps at the right and left sides, images, characters and patterns having different shapes at the right and left sides using the indication lamps or the display. Accordingly, the present invention is a technique capable of discriminating a mirror using all components based on visual information that can discriminate the right and the left.

Although some embodiments have been described herein, it should be understood that these embodiments are provided for illustration only and are not to be construed in any way as limiting the present invention, and that various modifications, changes, alterations, and equivalent embodiments can be made by those skilled in the art without departing from the spirit and scope of the invention. In addition, although advantageous effects of a certain component are not explicitly described in description of the embodiments of the present invention, it should be understood that predictable effects by the component are also recognized.

What is claimed is:

1. A robot comprising:
 a camera configured to acquire an image;
 a first indication lamp disposed at a first location;
 a second indication lamp disposed apart from the first location; and
 a controller configured to:
 compare an image learned and stored in the robot with the image acquired through the camera,
 compare operation information of each of the first and second indication lamps with the image acquired through the camera, and
 determine whether an obstacle found on a movement path of the robot is a mirror or another robot having a same shape as the robot under operation by comparing the stored image with the acquired image, wherein the obstacle found on the movement path is determined to be the mirror based on the first indication lamp being turned on and the second indication lamp being turned off in the image acquired through the camera, wherein the obstacle found on the movement path is determined to be another robot having the same shape as the robot under operation based on the first indication lamp being turned off and the second indication lamp being turned on in the image acquired through the camera.

2. The robot according to claim 1, wherein the stored image is an image learned based on an image of the robot.

3. The robot according to claim 1, wherein the controller is further configured to:
 convert a training image and the acquired image into image data;
 extract a data pattern corresponding to a feature of the image data converted by the controller; and
 store the data pattern as the stored image in a storage;
 wherein the controller is further configured to: determine whether the obstacle found on the movement path of the robot is a mirror or another robot having the same shape as the robot under operation by comparing the data pattern stored in the pattern storage with a data pattern of the acquired image.

4. The robot according to claim 1, wherein the controller is further configured to: compare operation information of the first and second indication lamps with the image acquired through the camera based on a determination that the obstacle found on the movement path is the mirror.

5. The robot according to claim 4, wherein the controller is further configured to:
 control the first and second indication lamps to operate differently based on a determination that the obstacle found on the movement path is the mirror, and
 compare the operation information of the indication lamps with the image acquired by the camera.

6. The robot according to claim 5, wherein the operation information of the indication lamps comprises information indicating that the first indication lamp is turned on and the second indication lamp is turned off.

7. The robot according to claim 1, wherein the first indication lamp is disposed at a location on a left portion of the robot and the second indication lamp is disposed at a location on a right portion of the robot.

8. The robot according to claim 1, wherein the controller is further
configured to: update location of the mirror on a map based on a determination that the obstacle is the mirror.

9. The robot according to claim 8, further comprising:
a drive unit configured to move the robot,
wherein the drive unit moves the robot to a location separated from the mirror by a preset distance and then moves the robot to be parallel to the mirror,
wherein the controller is further configured to: update location information of the mirror with movement location information acquired while the robot moves parallel to the mirror.

10. A method of updating a map using a robot, comprising:
locating an object during movement of the robot using a camera configured to acquire an image, wherein the camera is mounted on the robot,
comparing an image learned and stored in the robot with the image acquired through the camera,
comparing operation information of each of a first indication lamp and a second indication lamp with the image acquired through the camera, wherein the first indication lamp disposed a first location and the second indication lamp disposed apart from the first location,
determining whether the located object is a mirror or another robot having a same shape as the robot under operation by comparing the stored image with the acquired image, wherein the located object is determined to be the mirror based on the first indication lamp being turned on and the second indication lamp being turned off in the image acquired through the camera, wherein the located object is determined to be another robot having the same shape as the robot under operation based on the first indication lamp being turned off and the second indication lamp being turned on in the image acquired through the camera;
approaching a location disposed apart from the mirror by a preset distance based on a determination that the located object is the mirror;
acquiring movement location information while moving parallel to the mirror; and
updating location information of the mirror with the acquired movement location information.

11. The method of updating a map using a robot according to claim 10, wherein determining whether the located object is the mirror or another robot having the same shape of the robot under operation further comprises:
determining whether the located object is the another robot having the same shape as the robot under operation by comparing an image learned and stored in the robot with an current image acquired through the camera; and
controlling the first and second indication lamps disposed on the robot to perform different operations.

12. The method of updating a map using a robot according to claim 11, wherein
the different operations comprise an operation that the first indication lamp and the second indication lamp emit light having different colors, an operation that the first indication lamp is turned off and the second indication lamp is turned on, and an operation that the second indication lamp flickers while the first indication lamp is turned on.

13. The method of updating a map using a robot according to claim 12, wherein the first indication lamp is disposed at a location on a left portion of the robot and the second indication lamp is disposed at a location on a right portion of the robot.

14. The method of updating a map using a robot according to claim 12, wherein the stored image is a learned image based on an image of the robot.

15. The method of updating a map using a robot according to claim 10, wherein acquiring movement location information while moving parallel to the mirror further comprises:
a first movement step in which the robot is moved parallel to the mirror in one direction of a rightward direction and a leftward direction of the mirror after approaching a location disposed apart from the mirror, and
a second movement step in which the robot is moved in a different direction from a movement direction in the first movement step after the first movement step.

16. The method of updating a map using a robot according to claim 15, wherein each of the first movement step and the second movement step comprises moving the robot until a current image acquired through the camera becomes different from the stored image.

17. A robot comprising:
a camera configured to acquire an image;
a display configured to display at least one of images, characters and patterns in different shapes at a right and a left of the display, wherein the display comprises a first indication lamp disposed at a first location and a second indication lamp disposed at a second location;
a controller configured to:
compare an image learned and stored in the robot with the image acquired through the camera; and
compare information displayed on the display with the image acquired through the camera, and
determine whether an obstacle found on a movement path of the robot is a mirror or another robot having a same shape as the robot under operation by comparing the stored image with the acquired image, wherein the obstacle found on the movement path is determined to be the mirror based on the first indication lamp being turned on and the second indication lamp being turned off in the image acquired through the camera, wherein the obstacle found on the movement path is determined to be another robot having the same shape as the robot under operation based on the first indication lamp being turned off and the second indication lamp being turned on in the image acquired through the camera.

18. The robot according to claim 17, wherein the controller is further configured to:
convert a training image and the acquired image into image data;
extract a data pattern corresponding to a feature of the image data converted by the controller;
store the data pattern as the stored image in a storage; and
determine whether the obstacle found on the movement path of the robot is a mirror or a robot having the same shape as the robot under operation by comparing the data pattern stored in the storage with a data pattern of the acquired image.

* * * * *